(12) United States Patent
Ananth et al.

(10) Patent No.: US 11,362,425 B2
(45) Date of Patent: Jun. 14, 2022

(54) MULTI-BAND TRANSMIT-RECEIVE USING CIRCULAR POLARIZATION

(71) Applicant: SoftBank Corp., Tokyo (JP)

(72) Inventors: Sharath Ananth, Cupertino, CA (US); Alfred Cohen, Sunnyvale, CA (US)

(73) Assignee: SoftBank Corp., Tokyo (JP)

( * ) Notice: Subject to any disclaimer, the term of this patent is extended or adjusted under 35 U.S.C. 154(b) by 108 days.

(21) Appl. No.: 16/223,935

(22) Filed: Dec. 18, 2018

(65) Prior Publication Data
US 2020/0194897 A1 Jun. 18, 2020

(51) Int. Cl.
*H01Q 9/04* (2006.01)
*H01Q 21/24* (2006.01)
*H01Q 21/28* (2006.01)
*H04B 10/50* (2013.01)
*H04B 10/532* (2013.01)

(52) U.S. Cl.
CPC ........... *H01Q 9/0428* (2013.01); *H01Q 21/24* (2013.01); *H01Q 21/28* (2013.01); *H04B 10/501* (2013.01); *H04B 10/532* (2013.01)

(58) Field of Classification Search
CPC ..................................................... H01Q 9/428
See application file for complete search history.

(56) References Cited

U.S. PATENT DOCUMENTS

| | | | | |
|---|---|---|---|---|
| 3,353,182 A | * | 11/1967 | Hart | G01S 1/02 342/361 |
| 4,031,488 A | * | 6/1977 | Beno | H01P 1/185 333/262 |
| 5,596,336 A | * | 1/1997 | Liu | H01Q 13/10 343/700 MS |
| 2002/0077068 A1 | * | 6/2002 | Dent | H01Q 21/245 455/82 |

FOREIGN PATENT DOCUMENTS

| | | |
|---|---|---|
| EP | 1133002 A1 | 9/2001 |
| WO | 9722159 A1 | 6/1997 |
| WO | 2015105803 A1 | 7/2015 |

OTHER PUBLICATIONS

Reeve, Whitham D., "Antenna Application for the Quadrature Coupler," Jul. 28, 2014, Retrieved from the internet: <http://www.reeve.com/Documents/Articles%20Papers/Reeve_QuadCouplerApp.pdf>, 13 pages.
International Search Report and Written Opinion for Application No. PCT/US2019/066573 dated Mar. 19, 2020.

\* cited by examiner

*Primary Examiner* — Hsinchun Liao
(74) *Attorney, Agent, or Firm* — Botos Churchill IP Law

(57) ABSTRACT

The disclosure provides for a system for communication with a client device. The system includes a first transmitter configured to transmit a first signal and a second transmitter configured to transmit a second signal. The first signal is configured for a first communication band, and the second signal is configured for a second communication band different from the first communication band. The system also includes a hybrid coupler configured to split the first or second signal to a first part and a second part. In addition, the system also includes a first antenna configured to transmit the first part, and a second antenna configured to transmit the second part. The second antenna is oriented perpendicularly relative to an orientation of the first antenna.

17 Claims, 5 Drawing Sheets

MULTI-BAND TRANSMIT-RECEIVE USING CIRCULAR POLARIZATION

BACKGROUND

Information can be transmitted over directional point-to-point networks, such as aerospace and other mobile networks. In such networks, links can be formed between pairs of nodes by aiming transceivers of each node pair towards each other. In some implementations, nodes may include non-geostationary satellite orbit (NGSO) satellites or other high-altitude platforms (HAPs) that are in motion relative to the Earth. Such networks may be configured to provide service to multiple locations.

BRIEF SUMMARY

Aspects of the disclosure provide for a system for communication with a client device. The system includes a first transmitter configured to transmit a first signal, the first signal being configured for a first communication band; a second transmitter configured to transmit a second signal the second signal being configured for a second communication band different from the first communication band; a hybrid coupler configured to split the first signal or the second signal to a first part and a second part; a first antenna configured to transmit the first part; and a second antenna configured to transmit the second part, the second antenna being oriented perpendicularly relative to an orientation of the first antenna.

In one example, the system also includes a first diplexer configured to prevent interference between the first signal and an incoming signal. In another example, the system also includes one or more processors configured to operate a switch for the hybrid coupler. In this example, the one or more processors is configured to operate the switch when an indication is received by the one or more processors regarding whether the client device is capable of receiving circularly polarized signals.

In a further example, the first antenna and the second antenna are configured to receive a circularly polarized signal. In yet another example, the first antenna is further configured to receive a third signal having a first linear polarization direction, and the second antenna is further configured to receive a fourth signal having a second linear polarization direction. In a still further example, the system includes a communication device that is part of an access network for the client device.

Other aspects of the disclosure provide for a method for communication for communicating with a client device. The method includes transmitting, using a first transmitter, a first signal configured for a first communication band; transmitting, using a second transmitter, a second signal configured for a second communication band different from the first communication band; receiving, at a hybrid coupler, the first signal and the second signal; splitting, at the hybrid coupler, the first signal and the second signal into a first part and a second part; shifting, at the hybrid coupler, a phase of the second part of the first signal by 90 degrees relative to the first part of the first signal; and transmitting the first part of the first signal and the second signal using a first antenna and the second part of the first signal and the second signal using a second antenna, the second antenna being oriented perpendicularly relative to an orientation of the first antenna.

In one example, the method also includes shifting, at the hybrid coupler, a phase of the second part of the second signal by 90 degrees relative to the first part of the second signal in an opposite direction from the shifting of the phase of the second part of the first signal. In another example, the method also includes operating, by one or more processors, a switch for the hybrid coupler. In a further example, the first signal is configured to establish or maintain a connection between the client device and a communication device.

In yet another example, transmitting the first part of the first signal and the second signal using the first antenna and the second part of the first signal and the second signal using the second antenna forms at least one output signal that has circular polarization. In this example, the method also includes receiving, at the first antenna and the second antenna, one or more signals from the client device in response to the at least one output signal, the one or more signals having circular polarization or linear polarization; and establishing, by one or more processors, a connection between a network and the client device based on the received one or more signals. In a still further example, transmitting the first signal includes determining, by one or more processors, that the first signal requires amplification; and amplifying the first signal prior to transmitting the signal to the hybrid coupler.

Further aspects of the disclosure provide for an antenna system. The antenna system includes a first transmitter configured to transmit a first signal for a first communication band; a second transmitter configured to transmit a second signal for a second communication band different from the first communication band; a hybrid coupler configured to split at least one of the first signal or the second signal to a first part and a second part; a first antenna configured to transmit the first part of the at least one of the first signal or the second signal; and a second antenna configured to transmit the second part of the at least one of the first signal or the second signal, the second antenna being oriented perpendicularly relative to an orientation of the first antenna.

In one example, the antenna system also includes a switch for routing the at least one of the first signal or the second signal to the hybrid coupler or to the first and second antennas. In this example, when the switch is configured to route the at least one of the first signal or second signal to the hybrid coupler, an output signal from the first and second antennas has circular polarization; and when the switch is configured to route the at least one of the first signal or second signal to the first and second antennas, an output signal from the first and second antennas has linear polarization. Further in this example, the output signal is configured to establish or maintain a connection between a client device and a communication device.

In another example, the first antenna is configured to receive a first part of a received signal, the received signal having circular polarization; the second antenna is configured to receive a second part of the received signal; and the hybrid coupler is configured to phase shift the second part of the received signal and combine the second part with the first part of the received signal to form one or more combined signals. Also in this example, the antenna system also includes a first receiver configured to receive a third part of the one or more combined signals; and a second receiver configured to receive a fourth part of the one or more combined signals. Further in this example, the first signal is a high frequency signal; the second signal is a low frequency signal; the third part of the one or more combined signals is a high frequency signal; and the fourth part of the one or more combined signals is a low frequency signal.

DETAILED DESCRIPTION

Overview

The technology relates to a communication device that is configured to transmit one or more polarized signals and receive one or more circularly polarized signals. When transmitting a signal, the communication device may introduce a 90 degree phase shift between two parts of the signal and transmit the two parts at an angle to one another to produce the circular polarization. The circularly polarized signal may be transmitted to a client device. The communication device may also be configured to receive circularly polarized signals and process them to extract data. By using circular polarization, the client device may be more likely to obtain the circularly polarized signal and maintain that signal as compared to a signal that is not circularly polarized. In the same way, the communication device may also be more likely to obtain a signal that has circular polarization and maintain a better connection with the transmitting client device. More reliable service may therefore be provided to the client device due by the communication device to the polarization diversity of circular polarization.

Example Systems

Figure 1:
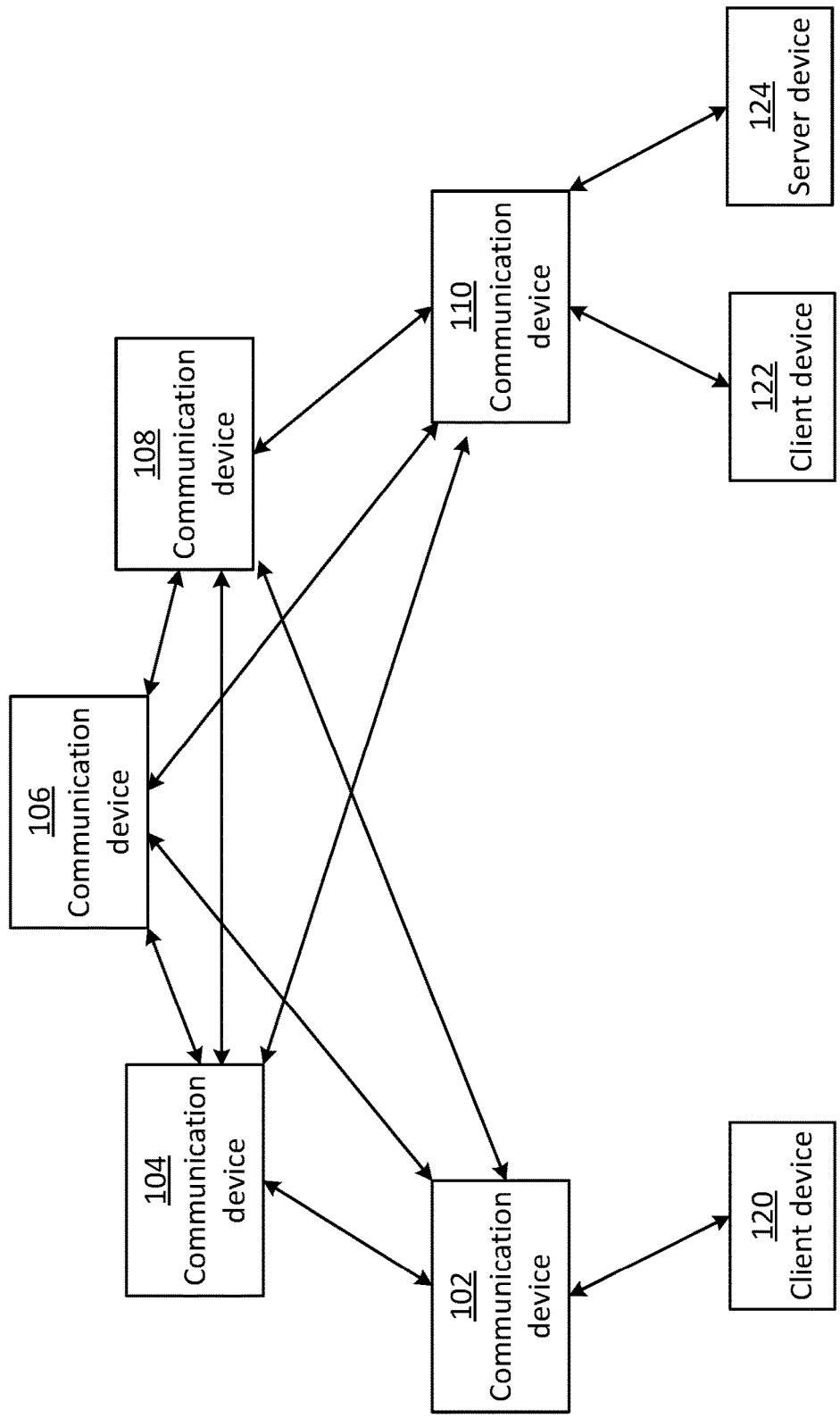
FIG. 1 is a block diagram of a network 100 in accordance with aspects of the disclosure.

As shown in FIG. 1, a plurality of communication devices may be configured to form a plurality of communication links thereby forming a communication network 100. Each communication device is a node of the communication network 100. The plurality of communication devices in communication network 100 includes communication devices 102, 104, 106, 108, and 110. Each communication device of the plurality of communication devices may be a part of a communication terminal, such as a ground communication terminal or a high-altitude platform (HAP) terminal. HAPs may be balloons, blimps or other dirigibles, airplanes, unmanned aerial vehicles (UAVs), satellites, or any other form of high altitude platform. Communication devices may additionally or alternatively be part of other types of moveable or stationary communication terminals. The plurality of communication links may be a subset of all possible links between ones of the plurality of communication devices. In the topology shown in FIG. 1, all possible links are illustrated as arrows.

The communication network 100 may also include client devices 120 and 122, server device 124 as nodes. Client devices may be cellular phones, laptop computers, desktop computers, wearable devices, or tablet computers. In some implementations, the communication network 100 may serve as an access network for the client devices. The communication network 100 also may be connected to a larger network, such as the Internet, and may be configured to provide a client device with access to resources stored on or provided through the larger computer network. The communication network 100 as shown in FIG. 1 is illustrative only, and in some implementations the communication network 100 may include additional or different communication devices, client devices, or server devices.

Figure 2:
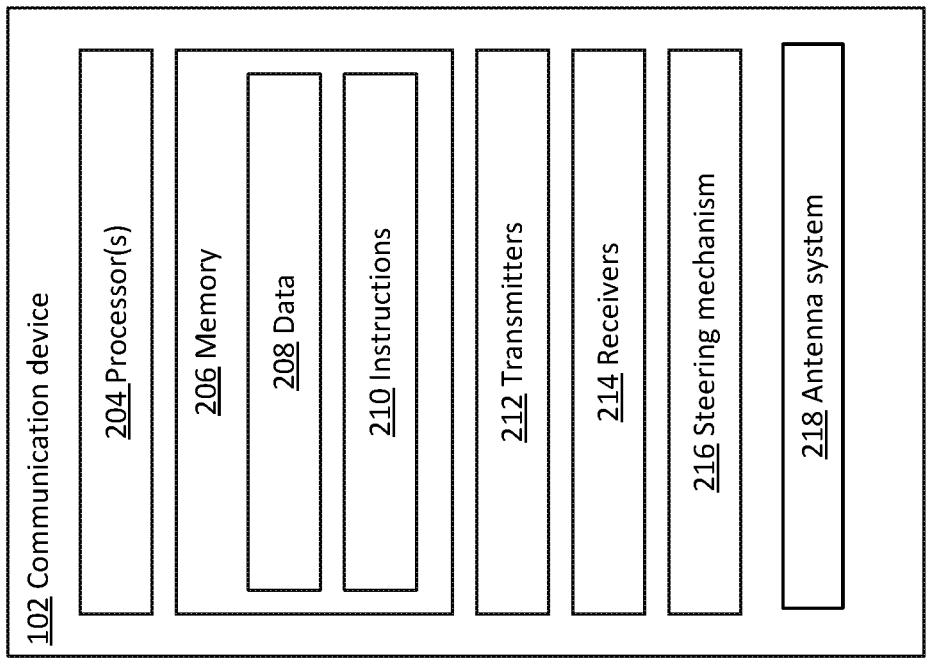
FIG. 2 is a block diagram 200 of a communication device in accordance with aspects of the disclosure.

FIG. 2 is a block diagram 200 of first communication device 102 of a first communication terminal configured to form one or more links with a second communication device, such as communication device 104, 106, 108 or client device 120 in the topology of FIG. 1. For example, the first communication device 102 includes as components one or more processors 204, a memory 206, transmitters 212a, 212b, receivers 214a, 214b, a steering mechanism 216, and an antenna system 218. The first communication device 102 may include other components not shown in FIG. 2.

The one or more processors 204 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 204 and memory 206 as being within the same block, the one or more processors 204 and memory 206 may actually comprise multiple processors and memories that may or may not be stored within the same physical housing. Accordingly, references to a processor or computer will be understood to include references to a collection of processors or computers or memories that may or may not operate in parallel.

Memory 206 may store information accessible by the one or more processors 204, including data 208, and instructions 210, that may be executed by the one or more processors 204. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 208 and instructions 210 are stored on different types of media. In the memory of each communication device, such as memory 206, calibration information may be stored, such as one or more offsets determined for tracking a signal.

Data 208 may be retrieved, stored or modified by the one or more processors 204 in accordance with the instructions 210. For instance, although the technology is not limited by any particular data structure, the data 208 may be stored in computer registers, in a relational database as a table having a plurality of different fields and records, XML documents or flat files.

The instructions 210 may be any set of instructions to be executed directly (such as machine code) or indirectly (such as scripts) by the one or more processors 204. For example, the instructions 210 may be stored as computer code on the computer-readable medium. In that regard, the terms "instructions" and "programs" may be used interchangeably herein. The instructions 210 may be stored in object code format for direct processing by the one or more processors 204, or in any other computer language including scripts or collections of independent source code modules that are interpreted on demand or compiled in advance. Functions, methods and routines of the instructions 210 are explained in more detail below.

The one or more processors 204 are in communication with the transmitters 212 and the receivers 214. Transmitter 212a and receiver 214a may be part of a first transceiver arrangement, and transmitter 212b and receiver 214b may be part of a second transceiver arrangement. The one or more processors 204 may therefore be configured to transmit, via the transmitters 212, data in a signal, and also may be configured to receive, via the receivers 214, communications and data in a signal. The transmitters 212 may be configured to transmit a radio-frequency signal and/or another type of signal. The receivers 214 may be configured to receive a radio-frequency signal and/or another type of signal. The received signal may be processed by the one or more processors 204 to extract the communications and data.

Furthermore, the one or more processors 204 are in communication with the steering mechanism 216 for adjusting the pointing direction of the antenna system 218 and/or signal. The pointing direction may be adjusted physically or electronically. The steering mechanism 216 may include one or more mirrors that steer a signal through the fixed lenses and/or may include a gimbal configured to move the antenna system 218 with respect to the first communication device 102. The steering mechanism 216 may be configured to steer the antenna system 218 and/or signal in at least two degrees of freedom, such as, for example, yaw and pitch. The adjustments to the pointing direction may be made to acquire a communication link, such as a link between first communication device 102 and client device 120. To perform a search for a communication link, the one or more processors 204 may be configured use the steering mechanism 216 to point the antenna system 218 in a series of varying directions until a communication link is acquired. In addition, the adjustments may optimize transmission of a signal from the antenna system 218 and/or reception of a signal at the antenna system 218.

Figure 3:
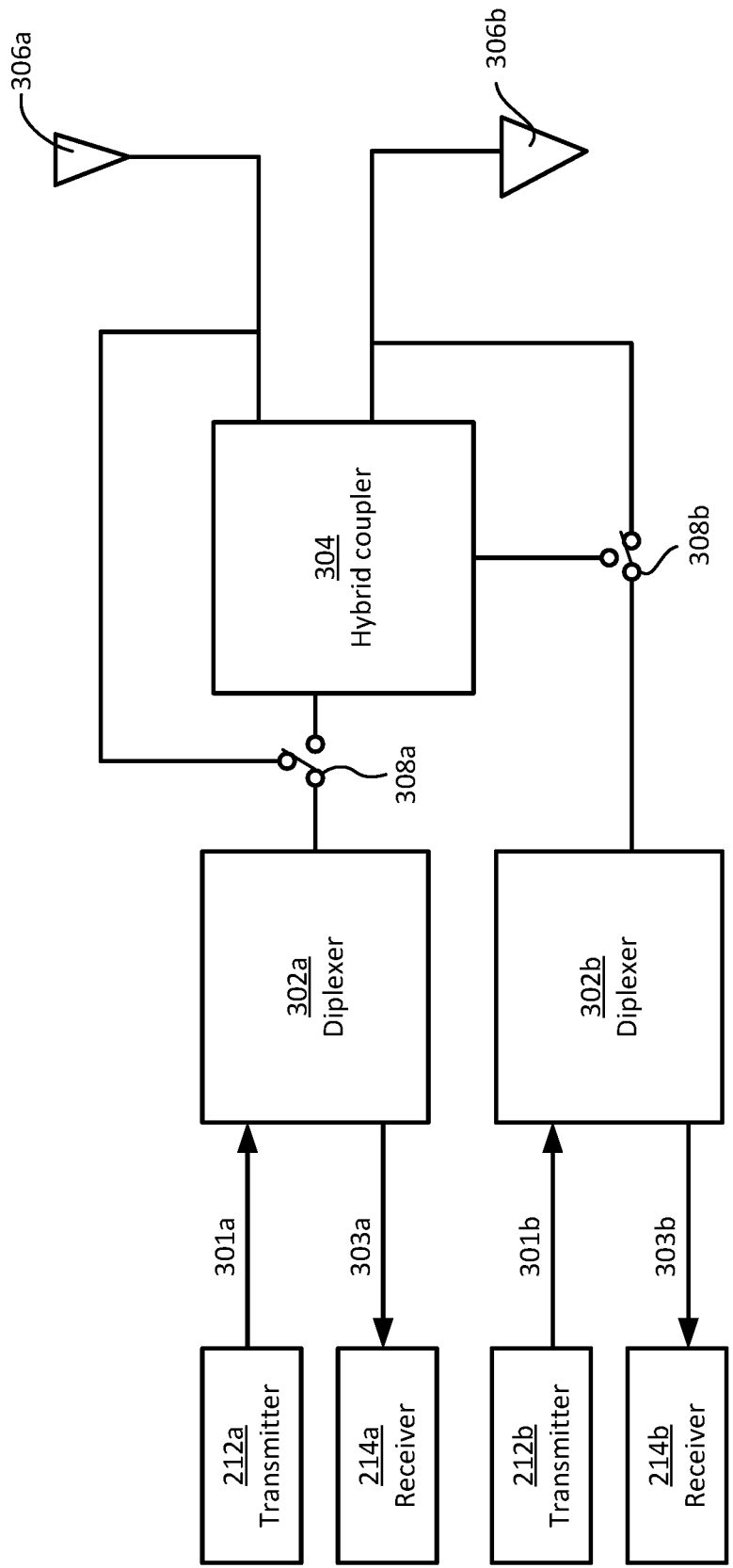
FIG. 3 is a block diagram of a system in accordance with aspects of the disclosure.

The first communication device 102 may also include the antenna system 218. As shown in FIG. 3, the antenna system may include a first diplexer 302a, a second diplexer 302b, a hybrid coupler 304, a first antenna 306a, and a second antenna 306b. The second antenna 306b may be oriented at a 90 degree angle relative to the first antenna 306a, allowing the two antennas to transmit two different polarization signals.

In a first instance, when a first outgoing signal 301a and a second outgoing signal 301b is transmitted using the transmitters 212a, 212b, respectively, the first diplexer 302a may be configured to receive the first outgoing signal 301a at a first port, and may be configured to output a first incoming signal 303a from a second port to the first receiver 214a. The first diplexer 302a may be configured to prevent interference between the first outgoing signal 301a and the first incoming signal 303a. Similarly, the second diplexer 302b may be configured to receive the second outgoing signal 301b at a third port, and may be configured to output a second incoming signal 303b from a fourth port to the second receiver 214b. The second diplexer 302b may be configured to prevent interference between the second outgoing signal 301b and the second incoming signal 303b. In this first instance, the first outgoing signal 301a and the second outgoing signal 301b may be a first frequency or group of frequencies for a first communication band. Alternatively, the first outgoing signal 301a may be a first frequency or group of frequencies for a first communication band, and the second outgoing signal 301b may be a second frequency or group of frequencies for a second communication band. In particular, the first outgoing signal 301a may be a high frequency signal, and the second outgoing signal 301b may be a low frequency signal.

The first diplexer 302a may feed the first outgoing signal 301a to the first antennas 306a, and the second diplexer 302b may feed the second outgoing signal 301b to the second antenna 306b. The first antenna 306a may then be configured to transmit the multiplexed signal with a linear polarization in a vertical plane, and the second antenna 306b may be configured to transmit the multiplexed signal with a linear polarization in a horizontal plane perpendicular to the vertical plane. The signal transmitted from the first and second antennas 306 may be received at a client device, such as client device 120.

In a second instance, the first outgoing signal 301a may be a first frequency or group of frequencies for a first communication band, and the second outgoing signal 301b may be a second frequency or group of frequencies for a second communication band different from the second communication band. In particular, the first outgoing signal 301a may be a high frequency signal, and the second outgoing signal 301b may be a low frequency signal. In this example, the power of each outgoing signal may be increased using an amplifier such that the power of the signal is higher than when two signals are being transmitted simultaneously. In this second instance, the first outgoing signal 301a may be transmitted from the first transmitter 212a and received at the first diplexer 302a. The first diplexer 302a may then pass the first outgoing signal 301a to the hybrid coupler 304, which may split the first outgoing signal 301a into a first part and a second part.

In some implementations, the antenna system 218 may be configured such that the first outgoing signal 301a may be received at the hybrid coupler 304 directly from the first transmitter 212a, without passing through the first diplexer 302a. The hybrid coupler 304 may also be configured to introduce a 90 degree phase shift between the first part and the second part. Alternatively, instead of a hybrid coupler 304, one or more components configured to split an outgoing signal into a first part and a second part and introduce the 90 degree phase shift between the first part and the second part may be utilized.

The first part of the first outgoing signal 301a may then be passed to the first antenna 306a to be transmitted, and the second part of the first outgoing signal 301a may be passed to the second antenna 306b to be transmitted. The effect of this arrangement is that the resulting first outgoing signal transmitted from the first and second antennas 306 has circular polarization. The circular polarization may be either right hand circular polarization or left hand circular polarization. The resulting first outgoing signal transmitted from the first and second antennas 306 may be received at a client device, such as client device 120.

Continuing to refer to the aforementioned second instance, the second outgoing signal 301b may be transmitted from the second transmitter 212b and received at the second diplexer 302b. The second diplexer 302b may then pass the second outgoing signal 301b to the hybrid coupler 304, which may split the second outgoing signal 301b into a first part and a second part. The first part of the second outgoing signal 301b may then be passed to the first antenna 306a to be transmitted, and the second part of the second outgoing signal 301b may be passed to the second antenna 306b to be transmitted. The resulting second outgoing signal may be transmitted from the first and second antennas 306 simultaneously with the resulting first outgoing signal. In addition, the resulting second outgoing signal may have circular polarization in an opposite direction from the resulting first outgoing signal. The resulting second outgoing signal transmitted from the first and second antennas 306 may be received at a client device, such as client device 120.

In some implementations, the antenna system 218 may include one or more switches 308a, 308b for the hybrid coupler 304. The one or more processors 204 may be configured to operate the switch to switch between linear and circular polarization. For example, the one or more switches 308a, 308b may cause the communications device to switch between the configurations of the first instance, which is depicted in FIG. 3, and the second instance, where both switches 308a and 308b are switched to connect with the hybrid coupler 304. The one or more switches 308a, 308b may be operated when an indication is received from a client device or other computing device, such as a server, regarding whether the client device is capable of receiving linearly polarized signals or circularly polarized signals. Additionally or alternatively, the one or more switches 308a, 308b may be operated based on a location of the communication device or a receiving client device and/or based on an operation of the communication device.

The first and second antennas 306 may also be configured to receive signals from a client device, such as client device 120, or another communication device in the network 100. The first and second antennas 306 may be configured to receive linearly polarized signals as well as circularly polarized signals given the respective 90-degree orientation of the second antenna 306b with the first antenna 306a. The switch for the hybrid coupler 304 may be operated to toggle between receiving linearly polarized signals and receiving circularly polarized signals. The one or more switches 308a, 308b may be operated when an indication is received from a client device or other computing device, such as a server, regarding whether the client device is transmitting linearly polarized signals or circularly polarized signals. Additionally or alternatively, the one or more switches 308a, 308b may be operated based on a location of the communication device or a transmitting client device and/or based on an operation of the communication device.

For linearly polarized signals, the first antenna 306a may receive a third incoming signal having a first polarization direction, and the second antenna 306b may receive a fourth incoming signal having a second polarization direction perpendicular to the first polarization direction. The third incoming signal may be fed from the first antenna 306a through the first diplexer 302a to the receiver 214a, and the fourth incoming signal may be fed from the second antenna 306b through the second diplexer 302b to the receiver 214b. The one or more processors 204 may combine the third incoming signal and the fourth incoming signal to extract a complete signal and data carried by the complete signal.

Alternatively, a high frequency portion of the third and/or fourth incoming signal may be received using the receiver 214a, and a low frequency portion of the third and/or fourth signal may be received using receiver 214b. For example, first diplexer 302a may filter out the low frequency portion, such as second frequencies of the second communication band, and second diplexer 302b may filter out the high frequency portion, such as first frequencies of the first communication band. In other implementations, a high-pass filter may be used to filter out the low frequency portion prior to transmission to the receiver 214a, and a low-pass filter may be used to filter out the high frequency portion prior to transmission to the receiver 214b. The one or more processors 204 may extract data from the high frequency portion, as well as data from the low frequency portion.

For a circularly polarized signal, the first antenna 306a may receive a first part of the circularly polarized signal having the first polarization direction, and the second antenna 306b may receive a second part of the circularly polarized signal having the second polarization direction perpendicular to the first polarization direction. The first part and the second part may be combined using the hybrid coupler 304 to obtain one or more combined signals. The combination of the first part and the second part may include phase shifting the second part by 90 degrees in a first direction to obtain a first combined signal. In addition, another combination of the first part and the second part may include phase shifting the second part by 90 degrees in a second direction opposite the first direction to obtain a second combined signal. Alternatively, the second combined signal may be obtained by phase shifting the first signal by 90 degrees in the first direction rather than phase shifting the second signal. The first combined signal may be fed from the hybrid coupler 304 through the first diplexer 302a to the first receiver 214a, and the second combined signal may be fed from the hybrid coupler 304 through the second diplexer 302b to the second receiver 214b. The first combined signal may be the first frequency or group of frequencies for the first communication band, and the second combined signal may be the second frequency or group of frequencies for the second communication band.

Additionally or alternatively, a combined signal may be split into a third part and a fourth part using the hybrid coupler 304 or using another one or more components, and the third part and the fourth part may be forwarded to receivers 214a and 214b, respectively. The third part may be a high frequency portion of the received signal, and the fourth part may be a low frequency portion of the received signal. In some implementations, a high-pass filter may be used to obtain the third part of the combined signal, and a low-pass filter may be used to obtain the fourth part of the combined signal.

Each of the communication devices 104, 106, 108, and 110 may include one or more processors, a memory, one or more transmitters, one or more receivers, a steering mechanism, and sensors similar to those described above. Client devices 120, 122 and server device 124 may also include one or more processors, a memory, one or more transmitters, and one or more receivers as described above.

Example Methods

Figure 4:
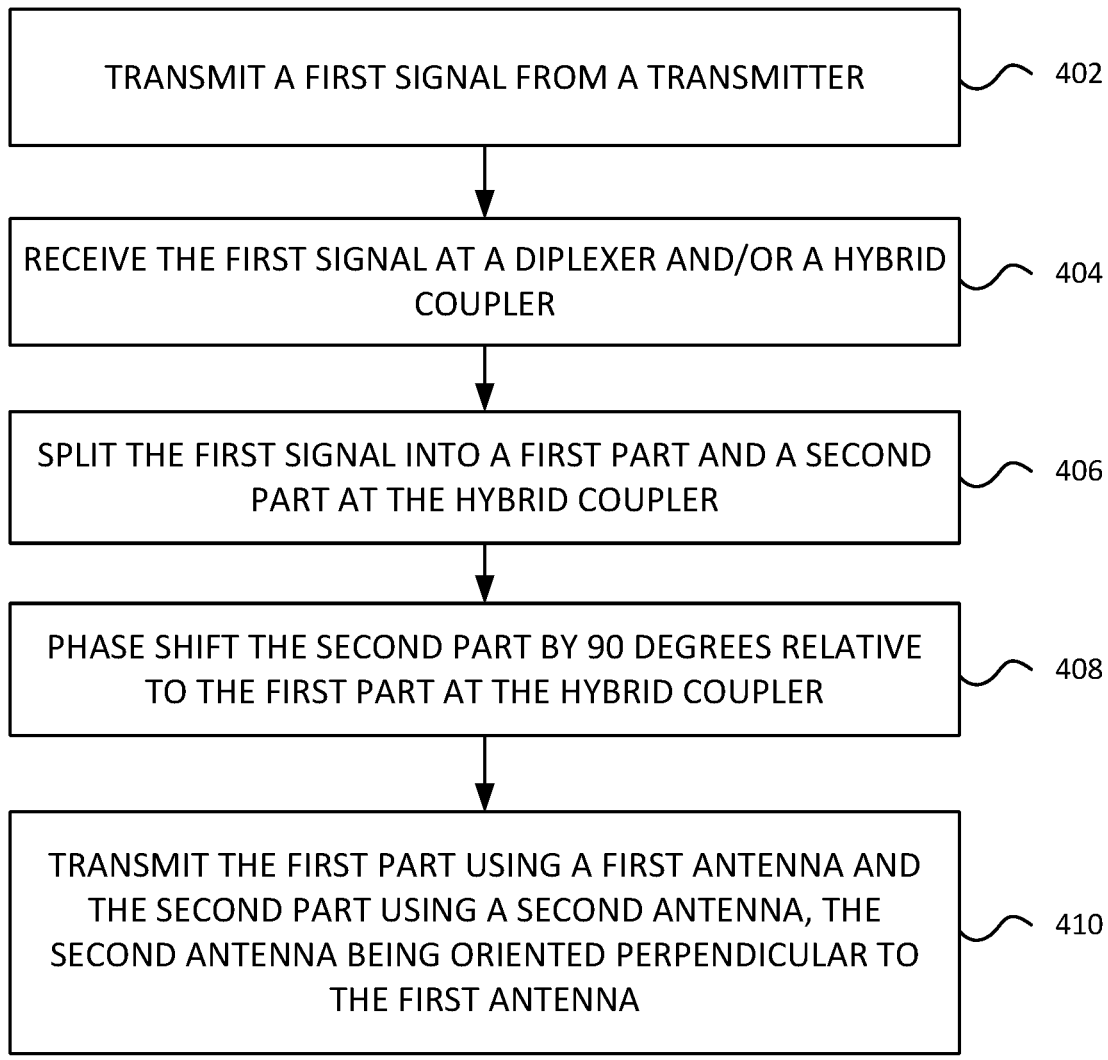
FIG. 4 is a flow diagram 400 depicting a method in accordance with aspects of the disclosure.

In FIG. 4, flow diagram 400 is shown in accordance with some of the aspects described above that may be performed, for instance, using the first communication device 102 to transmit a signal to a client device. While FIG. 4 shows blocks in a particular order, the order may be varied and that multiple operations may be performed simultaneously. Also, operations may be added or omitted.

At block 402, one or more processors 204 of a first communication device 102 may transmit a first outgoing signal using a transmitter. For instance, the one or more processors 204 may transmit a first outgoing signal using the transmitter 212a. The first outgoing signal may be configured to establish or maintain a connection between a client device and the network 100. In some implementations, the first outgoing signal may be amplified when it is determined that the first outgoing signal is the only signal being transmitted by the first communication device for a particular communication band. In addition or alternatively, the one or more processors 204 may transmit a second outgoing signal using the transmitter 212b. The second outgoing signal may be for a different communication band than the first outgoing signal.

At block 404, the first outgoing signal is received at a first diplexer 302a and/or a hybrid coupler 304 of the first communication device 102. For instance, the first outgoing signal may be received at the first diplexer 302a, which forwards the first outgoing signal to the hybrid coupler 304. Alternatively, the first outgoing signal may be received at the hybrid coupler 304 without passing through the first diplexer 302a. When a second outgoing signal is also transmitted, the second outgoing signal may be received at a second diplexer 302b and also forwarded to the hybrid coupler 304. Alternatively, the second outgoing signal may be received at the hybrid coupler 304 without passing through the second diplexer 302*b*.

At block 406, the first outgoing signal is then split into a first part and a second part. For instance, the first outgoing signal may be split by the hybrid coupler 304 into a first part and a second part. The second outgoing signal may also be split by the hybrid coupler 304 into a first part and a second part. At block 408, the second part of the first outgoing signal and/or the second outgoing signal may be phase shifted by 90 degrees relative to the respective first part. For instance, the second part may be phase shifted by 90 degrees relative to the first part at the hybrid coupler 304. In some implementations, the second part of the first outgoing signal may be phase shifted by 90 degrees in a first direction relative to the first part of the first outgoing signal, and the second part of the second outgoing signal may be phase shifted by 90 degrees in a second direction opposite the first direction relative to the first part of the second outgoing signal.

At block 410, the first part of the first outgoing signal and/or the second outgoing signal is transmitted from a first antenna of the first communication device, and the second part of the first outgoing signal and/or the second outgoing signal is transmitted from a second antenna of the first communication device. For instance, the first part is transmitted from the first antenna 306*a*, and the second part may be transmitted from the second antenna 306*b*. The second antenna 306*b* may be orientated 90 degrees clockwise or counterclockwise relative to an orientation of the first antenna 306*a*. As such, when the first part and the second part are transmitted, the first outgoing signal or the second outgoing signal may be circularly polarized or rather, transmitted using circular polarization. The first outgoing signal may be circularly polarized in a first direction, such as right hand circular polarization, and the second outgoing signal may be circularly polarized in a second direction opposite the first direction, such as left hand circular polarization.

In some implementations, the one or more processor 204 may select to transmit linearly polarized signals rather than circularly polarized signals. The selection to transmit linearly polarized signals may be made when an indication is received that the client device is unable to receive circularly polarized signals, when a detected location of the communication device or client device corresponds with an area designated for linear polarization, or when the communication device is determined to operate with linear polarization. The indication may be received from the client device or another computing device, such as a server. After the selection is made, the one or more processors 204 may operate the one or more switches 308*a*, 308*b* for the hybrid coupler 304 in order to bypass the hybrid coupler 304 and feed the first outgoing signal and the second outgoing signal directly to the first and second antennas 306*a*, 306*b*, respectively.

Figure 5:
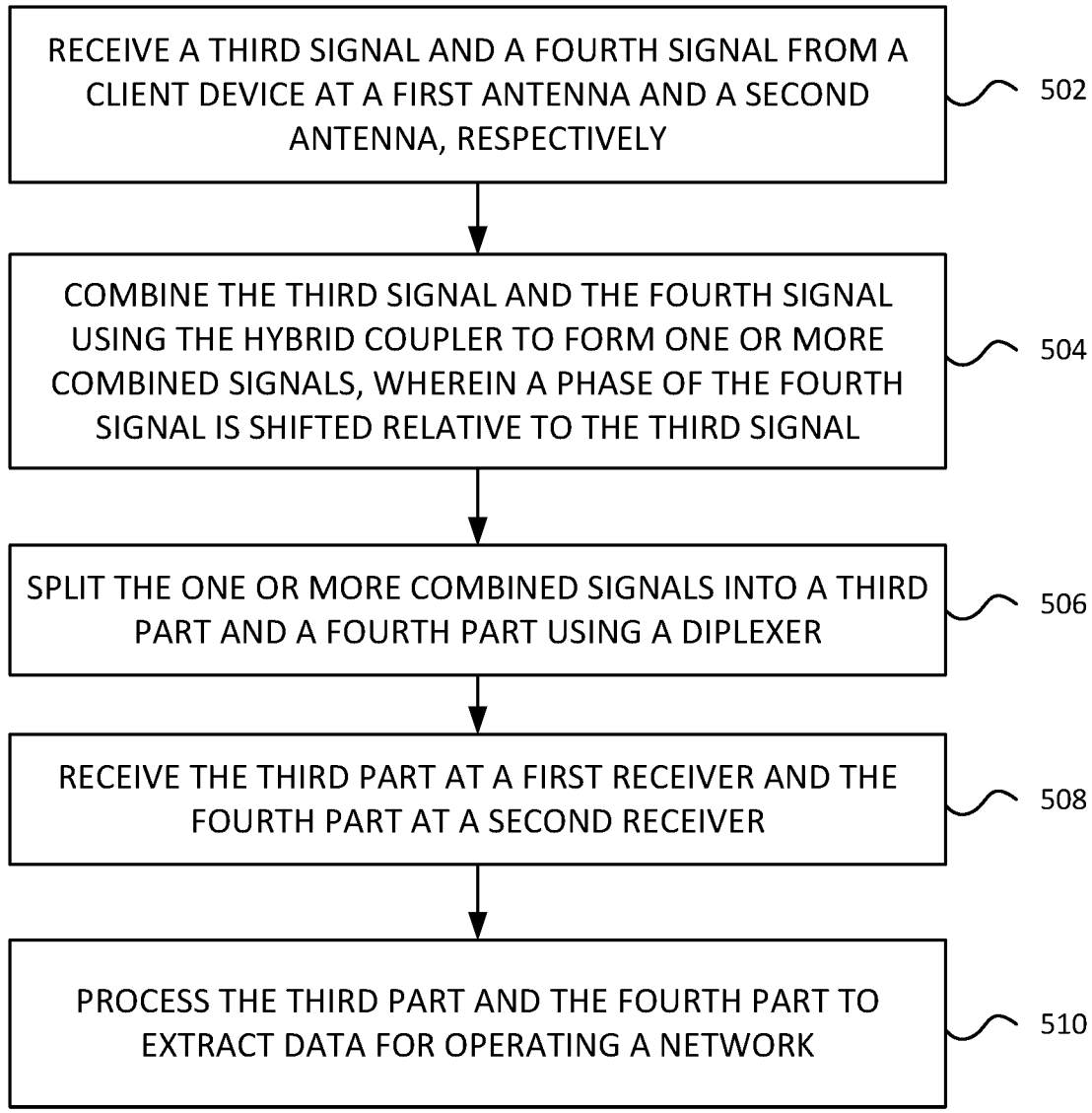
FIG. 5 is a flow diagram 500 depicting a method in accordance with aspects of the disclosure.

In FIG. 5, flow diagram 500 is shown in accordance with some of the aspects described above that may be performed, for instance, using the first communication device 102 to receive a signal from a client device. While FIG. 5 shows blocks in a particular order, the order may be varied and that multiple operations may be performed simultaneously. Also, operations may be added or omitted.

At block 502, a third incoming signal having a first polarization direction may be received at the first antenna 306*a*, and a fourth incoming signal having a second polarization direction perpendicular to the first polarization direction may be received at the second antenna 306*b*. The third incoming signal and the fourth incoming signal may be received from a client device, such as client device 120. In some implementations, the third incoming signal may on the first communication band, such as a high frequency signal, and the fourth incoming signal may on the second communication band, such as a low frequency signal. Alternatively, the third incoming signal may be a first part of a circularly polarized signal, and the fourth incoming signal may be a second part of the circularly polarized signal.

At block 504, the third incoming signal and the fourth incoming signal may be combined using the hybrid coupler 304 to form one or more combined signals. Combining the third and fourth incoming signals may include phase shifting the fourth signal by 90 degrees in a first direction relative to the third signal before adding the third and fourth signals to form a first combined signal. Combining the third and fourth signals may also include phase shifting the fourth signal by 90 degrees in a second direction opposite the first direction relative to the third signal before adding the third and fourth signals to form a second combined signal. Alternatively, the hybrid coupler 304 may be bypassed in some implementations using one or more switches 308*a*, 308*b*. The hybrid coupler 304 may be bypassed when the third incoming signal and the fourth incoming signal are linearly polarized signals, rather than two parts of a circularly polarized signal. The one or more switches 308*a*, 308*b* may be operated by the one or more processors 204 when an indication is received that the client device is transmitting linearly polarized signals, when a detected location of the communication device or client device corresponds with an area designated for linear polarization, or when the communication device is determined to operate with linear polarization. In this implementation, the third incoming signal and the fourth incoming signal may be combined using a multiplexer, a phase shifter and/or one or more other components.

At block 506, the one or more combined signals may be split into a third part and a fourth part at the hybrid coupler 304 and/or one or more other components. The third part may be a high frequency portion of one or more combined signals, and the fourth part may be a low frequency portion of one or more combined signals. The third part may be obtained using a high-pass filter, and the fourth part may be obtained using a low-pass filter. In some implementations, the third part may be the first combined signal, and the fourth part may be the second combined signal. In other implementations where the received signals are linearly polarized, the third part may correspond with the third incoming signal and the fourth part may correspond with the fourth incoming signal.

At block 508, the third part of the one or more combined signal may be received by the one or more processors 204 using first receiver 214*a*, and the fourth part of the one or more combined signal may be received by the one or more processors 204 using second receiver 214*b*. Alternatively, the third incoming signal received at first antenna 306*a* may be directly fed to first receiver 214*a* without passing through the hybrid coupler 304. Similarly, the fourth incoming signal received at second antenna 306*b* may also be directly fed to second receiver 214*b* without passing through the hybrid coupler 304.

At block 510, the one or more processors 204 may process the third part of the one or more combined signal and the fourth part of the one or more combined signal to extract data. The one or more processors 204 may process the third part to extract first data, and also may process the fourth part to extract second data different from the first data. Alternatively, the one or more processors 204 may process the third part and the fourth part together to extract data. In other examples, the one or more processors 204 may combine or process both the third and fourth incoming signals that are received directly from antennas 306 and extract data. The data may include data for transmission through the network or data related to operating a connection with the client device.

The features described above provide a communication device configured to connect to a client device using circular polarization. By using circular polarization, the client device may be more likely to obtain the circularly polarized signal and maintain that signal as compared to a signal that is not circularly polarized. In the same way, the communication device may also be more likely to obtain a signal that has circular polarization and maintain a better connection with the transmitting client device. More reliable service may therefore be provided to the client device due by the communication device to the polarization diversity of circular polarization.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for communication with a client device, the system comprising:
    a first transmitter configured to transmit a first signal, the first signal being configured for a first communication band;
    a second transmitter configured to transmit a second signal the second signal being configured for a second communication band different from the first communication band;
    a hybrid coupler configured to split the first signal or the second signal to a first part and a second part;
    a first antenna configured to transmit the first part;
    a second antenna configured to transmit the second part, the second antenna being oriented perpendicularly relative to an orientation of the first antenna;
    one or more processors configured to operate a switch for the hybrid coupler to switch between linear polarization and circular polarization; and
    wherein the first antenna transmitting the first part and the second antenna transmitting the second part forms a complete circularly polarized signal; and
    wherein the one or more processors are configured to operate the switch when an indication is received by the one or more processors regarding whether the client device is capable of receiving circularly polarized signals.

2. The system of claim 1, wherein the first antenna and the second antenna are configured to receive a circularly polarized signal.

3. The system of claim 1, wherein the first antenna is further configured to receive a third signal having a first linear polarization direction, and the second antenna is further configured to receive a fourth signal having a second linear polarization direction.

4. The system of claim 1, wherein the system includes a communication device that is part of an access network for the client device.

5. A method for communication for communicating with a client device, the method comprising:
    transmitting, using a first transmitter, a first signal configured for a first communication band;
    transmitting, using a second transmitter, a second signal configured for a second communication band different from the first communication band;
    operating, by one or more processors, a switch for a hybrid coupler when an indication is received by the one or more processors regarding whether the client device is capable of receiving circularly polarized signals;
    receiving, at a hybrid coupler, the first signal and the second signal;
    splitting, at the hybrid coupler, the first signal and the second signal into a first part and a second part;
    shifting, at the hybrid coupler, a phase of the second part of the first signal by 90 degrees relative to the first part of the first signal; and
    transmitting, using at most a first antenna and a second antenna, the first part of the first signal, the first part of the second signal, the second part of the first signal, and the second part of the second signal in at least one complete circularly polarized output signal, the second antenna being oriented perpendicularly relative to an orientation of the first antenna.

6. The method of claim 5, further comprising shifting, at the hybrid coupler, a phase of the second part of the second signal by 90 degrees relative to the first part of the second signal in an opposite direction from the shifting of the phase of the second part of the first signal.

7. The method of claim 5, wherein the first signal is configured to establish or maintain a connection between the client device and a communication device.

8. The method of claim 5, wherein the first part of the first signal, the second part of the second signal, the second part of the first signal, and the second part of the second signal are transmitted in two complete circularly polarized output signals.

9. The method of claim 8, further comprising:
    receiving, at the first antenna and the second antenna, one or more signals from the client device in response to at least one of the output signals, the one or more signals having circular polarization or linear polarization; and
    establishing, by one or more processors, a connection between a network and the client device based on the received one or more signals.

10. The method of claim 5, wherein transmitting the first signal includes:
    determining, by one or more processors, that the first signal requires amplification; and
    amplifying the first signal prior to transmitting the first signal to the hybrid coupler.

11. The system of claim 1, wherein the one or more processors are configured to operate a steering mechanism to adjust a pointing direction of the system.

12. A system for communication with a client device, the system comprising:
    a first transmitter configured to transmit a first signal, the first signal being configured for a first communication band;

a first diplexer configured to prevent interference between the first signal and an incoming signal;

a second transmitter configured to transmit a second signal the second signal being configured for a second communication band different from the first communication band;

a hybrid coupler configured to split the first signal or the second signal to a first part and a second part;

a first antenna configured to transmit the first part;

a second antenna configured to transmit the second part, the second antenna being oriented perpendicularly relative to an orientation of the first antenna;

one or more processors configured to operate a switch for the hybrid coupler to switch between linear polarization and circular polarization; and wherein the first antenna transmitting the first part and the second antenna transmitting the second part forms a complete circularly polarized signal.

13. An antenna system comprising:

a first transmitter configured to transmit a first signal for a first communication band;

a second transmitter configured to transmit a second signal for a second communication band different from the first communication band;

a hybrid coupler configured to split at least one of the first signal or the second signal to a first part and a second part;

a first antenna configured to transmit the first part of the at least one of the first signal or the second signal;

a second antenna configured to transmit the second part of the at least one of the first signal or the second signal, the second antenna being oriented perpendicularly relative to an orientation of the first antenna; and one or more switches that switch between routing the at least one of the first signal or the second signal to the hybrid coupler and routing the at least one of the first signal or the second signal to the first or second antennas; and when the one or more switches are configured to route the at least one of the first signal or second signal to the hybrid coupler, an output signal from the first and second antennas has circular polarization; and when the one or more switches are configured to route the at least one of the first signal or second signal to the first and second antennas, an output signal from the first and second antennas has linear polarization.

14. The antenna system of claim 13, wherein the one or more switches comprises a first switch configured to switch between routing the first signal to the hybrid coupler and routing the first signal to the first antenna; and a second switch that switches between routing the second signal to the hybrid coupler and routing the second signal to the second antenna.

15. The antenna system of claim 13, wherein the output signal is configured to establish or maintain a connection between a client device and a communication device.

16. The antenna system of claim 13, wherein:

the first antenna is configured to receive a first part of a received signal, the received signal having circular polarization;

the second antenna is configured to receive a second part of the received signal; and the hybrid coupler is configured to phase shift the second part of the received signal and combine the second part with the first part of the received signal to form one or more combined signals; and the antenna system further comprises:

a first receiver configured to receive a third part of the one or more combined signals; and a second receiver configured to receive a fourth part of the one or more combined signals.

17. The antenna system of claim 16, wherein:

the first signal is a high frequency signal;

the second signal is a low frequency signal;

the third part of the one or more combined signals is a high frequency signal; and the fourth part of the one or more combined signals is a low frequency signal.

* * * * *